United States Patent
Paczkowski et al.

(10) Patent No.: US 11,582,636 B1
(45) Date of Patent: Feb. 14, 2023

(54) WIRELESS COMMUNICATION SERVICE OVER A WIRELESS NETWORK SLICE BASED ON USER EQUIPMENT (UE) CONCENTRATIONS

(71) Applicant: T-Mobile Innovations LLC, Overland Park, KS (US)

(72) Inventors: Lyle Walter Paczkowski, Mission Hills, KS (US); Ada Nelly Pitocco, Saint Charles, IL (US); Zachary Kenneth McLain, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/372,923

(22) Filed: Jul. 12, 2021

(51) Int. Cl.
*H04W 28/02* (2009.01)
*H04W 36/22* (2009.01)

(52) U.S. Cl.
CPC ... *H04W 28/0289* (2013.01); *H04W 28/0226* (2013.01); *H04W 36/22* (2013.01)

(58) Field of Classification Search
CPC ......... H04W 28/0289; H04W 28/0226; H04W 36/22
See application file for complete search history.

(56) References Cited

U.S. PATENT DOCUMENTS

| | | | |
|---|---|---|---|
| 10,531,420 B2 | 1/2020 | Li et al. | |
| 10,616,934 B2 | 4/2020 | Talebi Fard et al. | |
| 10,674,469 B2 | 6/2020 | Kim et al. | |
| 10,820,185 B2 | 10/2020 | Faccin et al. | |
| 2019/0174449 A1 | 6/2019 | Shan et al. | |
| 2019/0182737 A1 | 6/2019 | Futaki et al. | |
| 2020/0178196 A1 | 6/2020 | Wang et al. | |
| 2022/0191737 A1* | 6/2022 | Mindler | H04W 28/0967 |

\* cited by examiner

*Primary Examiner* — Kibrom T Hailu (57) ABSTRACT

A wireless communication network serves User Equipment (UEs) over a wireless network slice. A core user-plane in the slice exchanges user data with the UEs over a Radio Access Network (RAN). The core control-plane determines when the slice has a concentration of UEs that exceeds a threshold in a geographic area. When the slice has the UE concentration that exceeds the threshold in the geographic area, the core control-plane signals an edge user-plane to serve the UEs that use the wireless network slice in the geographic area. The edge user-plane exchanges additional user data over the RAN with the UEs that use the wireless network slice in the geographic area. The core control-plane may determine when the concentration of UEs moves toward another geographic area and proactively launch another edge user-plane to serve the UEs that will soon need the slice in the other geographic area.

20 Claims, 13 Drawing Sheets

WIRELESS COMMUNICATION SERVICE OVER A WIRELESS NETWORK SLICE BASED ON USER EQUIPMENT (UE) CONCENTRATIONS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), Application Server Functions (ASFs), and the like. Some network elements like UPFs and ASFs are grouped into wireless network slices. An individual wireless user device may request a specific wireless network slice.

Although the network elements are concentrated in the wireless network cores, new network elements are often deployed at the wireless network edge that is near the wireless access nodes. Thus, some wireless user devices interact with the network elements at the network edge instead of the network elements in the network core. Unfortunately, the wireless network slices ineffectively use the edge network elements. Moreover, the wireless network slices inefficiently use the edge network elements given the location and movement of the wireless user devices.

TECHNICAL OVERVIEW

A wireless communication network serves User Equipment (UEs) over a wireless network slice. A core user-plane in the slice exchanges user data with the UEs over a Radio Access Network (RAN). The core control-plane determines when the slice has a concentration of UEs that exceeds a threshold in a geographic area. When the slice has the UE concentration that exceeds the threshold in the geographic area, the core control-plane signals an edge user-plane to serve the UEs that use the wireless network slice in the geographic area. The edge user-plane exchanges additional user data over the RAN with the UEs that use the wireless network slice in the geographic area. The core control-plane may determine when the concentration of UEs moves toward another geographic area and proactively launch another edge user-plane to serve the UEs that will soon need the slice in the other geographic area.

DETAILED DESCRIPTION

Figure 1:
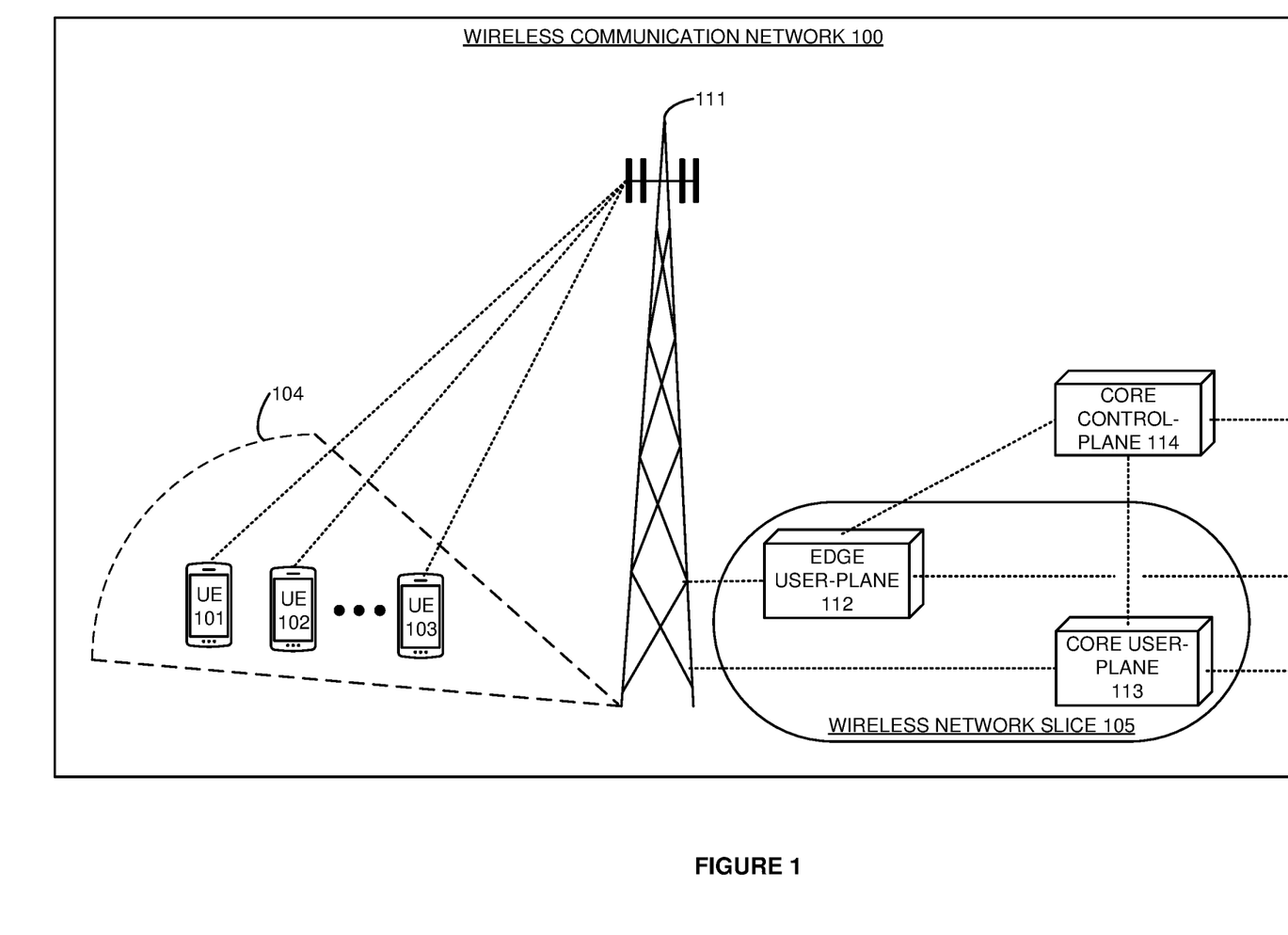
FIG. 1 illustrates a wireless communication network that serves User Equipment (UEs) over a wireless network slice based on geographic UE concentrations.

FIG. 1 illustrates wireless communication network 100 that serves User Equipment (UEs) 101-103 over wireless network slice 105 based on geographic UE concentrations. Wireless communication network 100 comprises UEs 101-103, Radio Access Network (RAN) 111, wireless network slice 105, and core control-plane 114. Wireless network slice 105 comprises edge user-plane 112 and core user-plane 113. UEs 101-103 comprise computers, phones, vehicles, sensors, robots, or some other data appliances with communication circuitry. UEs 101-103 are physically located in geographic area 104. Geographic area 104 comprises a network sector, geo-fence, enterprise site, or some other geographic boundary. Wireless communication network 100 is simplified and typically includes more geographic areas, slices, UEs, RANs, and user-planes than shown.

Various examples of network operation and configuration are described herein. In some examples, UEs 101-103 and core user-plane 113 exchange user data over RAN 111. Core control-plane 114 determines when wireless network slice 105 serves a UE concentration that exceeds a threshold in geographic area 104. In this example, this threshold is two UEs but would typically be higher. When wireless network slice 105 serves a concentration of three UEs 101-103 in geographic area 104, core control-plane 114 signals edge user-plane 112 in wireless network slice 105 to serve UEs 101-103 that use wireless network slice 105 in geographic area 104. To use wireless network slice 105 in geographic area 104, UEs 101-103 exchange additional user data with edge user-plane 112 over RAN 111.

In some examples, core control-plane 114 determines when the concentration of UEs 101-103 using slice 105 moves to an adjacent geographic area. In response, core control-plane 114 signals an adjacent edge user-plane to serve UEs 101-103 for wireless network slice 105. Core control-plane 114 may first determine whether the adjacent edge user-plane delivers a quality-of-service that is suitable for wireless network slice 105. Core control-plane 114 may preemptively launch the adjacent edge user-plane based on the projected movement of UEs 101-103. Advantageously, wireless network slice 105 effectively uses edge user-plane 112. Moreover, wireless network slice 105 efficiently uses edge user-plane 112 based on the location and movement of UEs 101-103.

Core control-plane 114 comprises network elements like Access and Mobility Management Function (AMF), Session Management Function (SMF), and Network Slice Selection Function (NSSF). User-planes 111-112 comprise network elements like User-Plane Function (UPF), and Application Server Function (ASF). UEs 101-103 communicate with RAN 111 over technologies like Fifth Generation New Radio (5GNR), Long Term Evolution (LTE), Institute of Electrical and Electronic Engineers (IEEE) 802.11 (WIFI), Bluetooth, or some other wireless communication protocol. The various communication links in wireless communication network 100 are represented by dotted lines on FIG. 1 and use metallic wiring, glass fibers, radio channels, or some other communication media. These communication links use IEEE 802.3 (Ethernet), Time Division Multiplex (TDM), Data Over Cable System Interface Specification (DOCSIS), WIFI, 5GNR, LTE, Internet Protocol (IP), General Packet Radio Service Transfer Protocol (GTP), virtual switching, inter-processor communication, bus interfaces, and/or some other data communication protocols. UEs 101-103, RAN 111, and planes 112-114 comprise microprocessors, software, memories, transceivers, bus circuitry, and the like. UEs 101-103 and RAN 111 also comprise radios. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
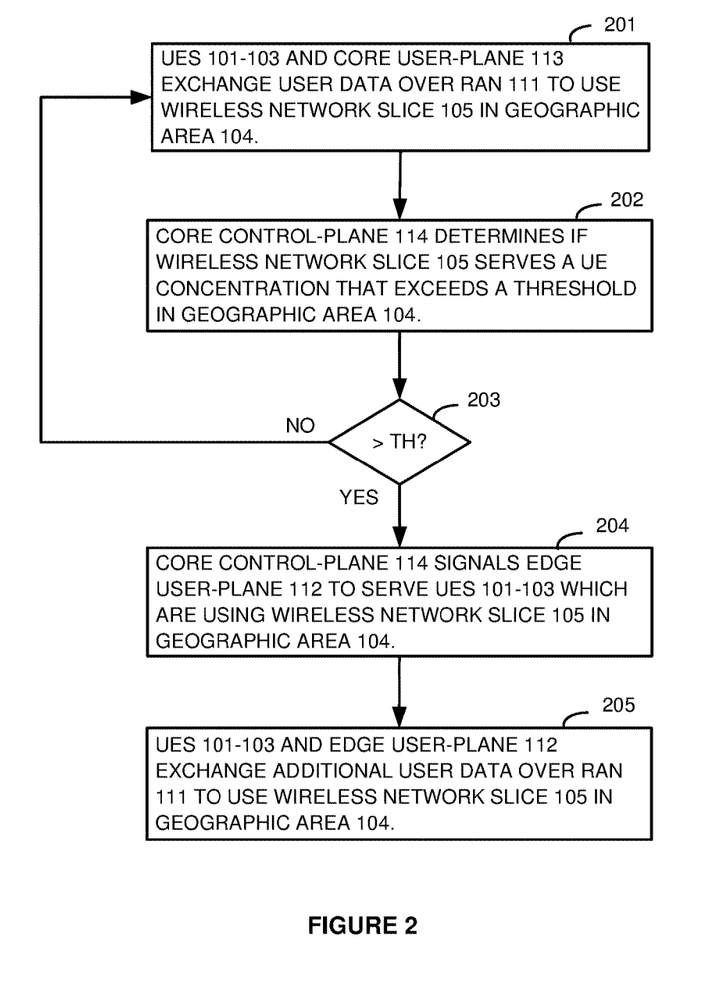
FIG. 2 illustrates an exemplary operation of the wireless communication network to serve the UEs over the wireless network slice based on the geographic UE concentrations.

FIG. 2 illustrates an exemplary operation of wireless communication network 100 to serve UEs 101-103 over wireless network slice 105 based on the geographic UE concentrations. The operation may vary in other examples. Initially, UEs 101-103 and core user-plane 113 exchange user data over RAN 111 to use wireless network slice 105 in geographic area 104 (201). Core control-plane 114 determines if wireless network slice 105 serves a UE concentration that exceeds a threshold in geographic area 104 (202). When wireless network slice 105 serves a UE concentration that exceeds the threshold in geographic area 104 (203), core control-plane 114 signals edge user-plane 112 to serve UEs 101-103 which are using wireless network slice 105 in geographic area 104 (204). UEs 101-103 and edge user-plane 112 then exchange additional user data over RAN 111 to use wireless network slice 105 in geographic area 104 (205).

Figure 3:
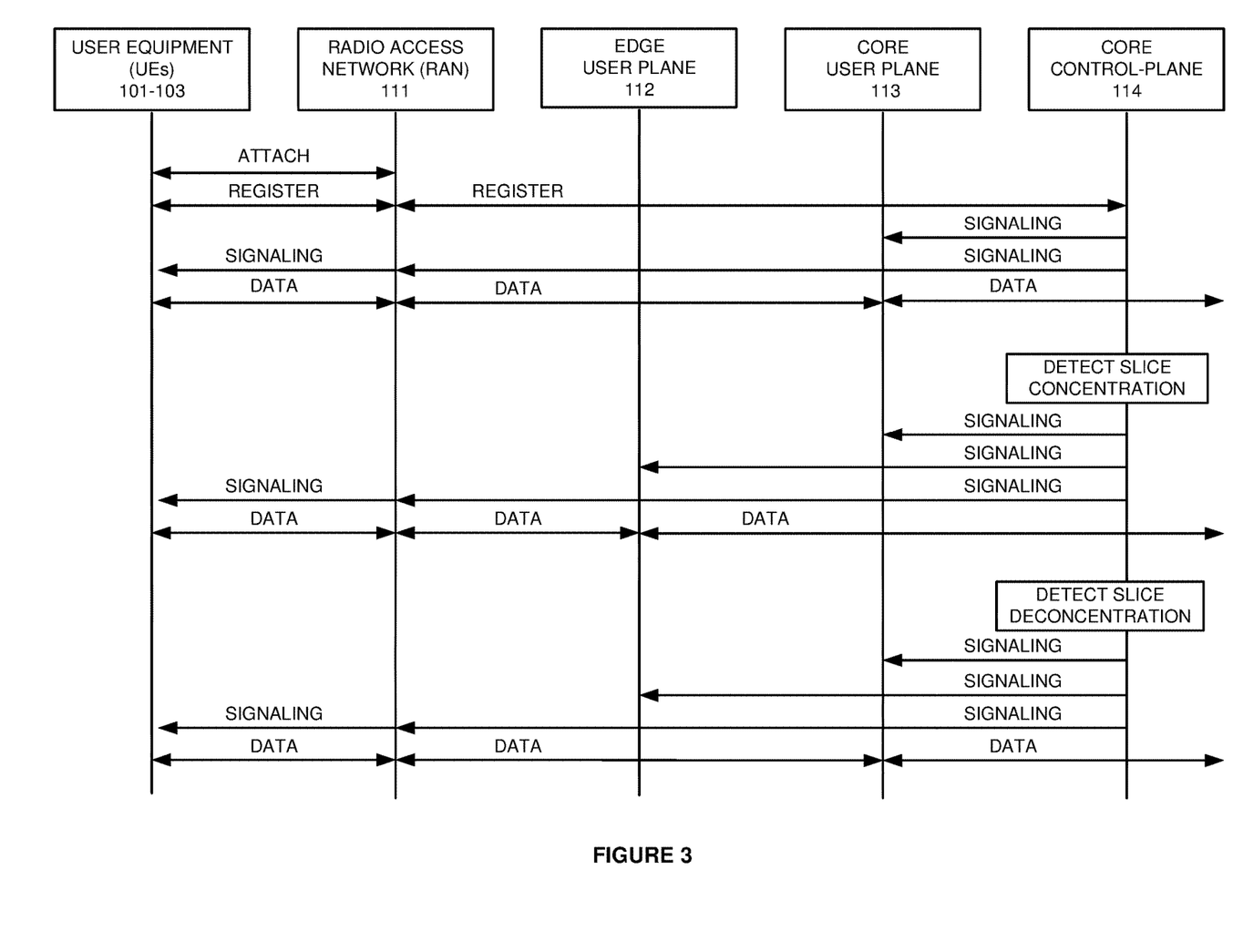
FIG. 3 illustrates an exemplary operation of the wireless communication network to serve the UEs over the wireless network slice based on the geographic UE concentrations.

FIG. 3 illustrates an exemplary operation of wireless communication network 100 to serve UEs 101-103 over wireless network slice 105 based on the geographic UE concentrations. The operation may vary in other examples. UEs 101-103 wirelessly attach to RAN 111. UEs 101-103 and core control-plane 114 communicate over RAN 111 to perform individual UE registrations. Core control-plane 114 signals core user-plane 113 to serve UEs 101-103. Core control-plane 114 signals RAN 111 to serve UEs 101-103. Core control-plane 114 signals UEs 101-103 over RAN 111 to use wireless network slice 105 over RAN 111. UEs 101-103 exchange user data over RAN 111 and core user-plane 113 to use wireless network slice 105 in geographic area 104.

Core control-plane 114 detects when wireless network slice 105 is serving a UE concentration that exceeds a threshold in geographic area 104, and in response, signals edge user-plane 112 to start serving UEs 101-103 and signals core user-plane 113 to stop serving UEs 101-103. UEs 101-103 now exchange user data over RAN 111 and edge user-plane 112 to use wireless network slice 105 in geographic area 104.

Core control-plane 114 then detects when wireless network slice 105 is no longer serving the UE concentration that exceeds the threshold in geographic area 104. In response, core control-plane 114 signals core user-plane 113 to start serving UEs 101-103 and signals edge user-plane 112 to stop serving UEs 101-103. UEs 101-103 now exchange user data over RAN 111 and core user-plane 113 to use wireless network slice 105 in geographic area 104.

In a similar manner, core control-plane 114 may start and stop edge user-planes that serve the geographic areas that are traversed by UEs 101-103. Core control-plane 114 may project the future locations of UEs 101-103 based on past movements and launch edge user planes in the future locations. For example, core control-plane 114 may identify a common route for a fleet of vehicle UEs and start/stop edge user planes to serve a vehicle slice all along the vehicles' route.

Figure 4:
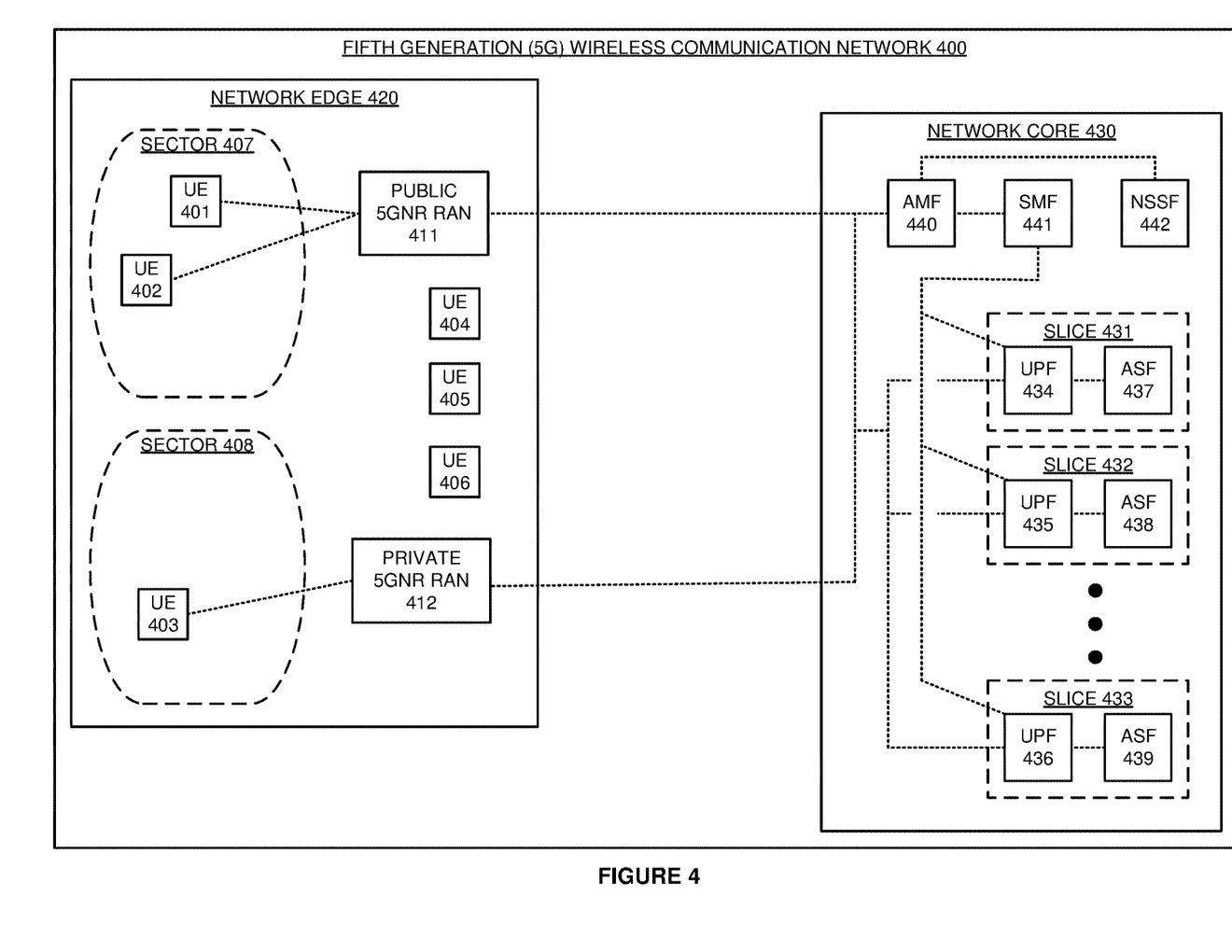
FIG. 4 illustrates a Fifth Generation (5G) wireless communication network to serve UEs over wireless network slices based on geographic UE concentrations.

FIG. 4 illustrates a Fifth Generation (5G) wireless communication network 400 to serve UEs 401-406 over wireless network slices 431-433 based on geographic UE concentrations. 5G wireless communication network 400 comprises an example of wireless communication network 100, although network 100 may differ. 5G wireless communication network 400 comprises network edge 420 and network core 430. Network edge 420 comprises UEs 401-406, public 5G New Radio (5GNR) RAN 411, and private 5GNR RAN 412. Network core 430 comprises wireless network slices 431-433, Access and Mobility Management Function (AMF) 440, Session Management Function (SMF) 441, Network Slice Selection Function (NSSF) 442. Wireless network slice 431 comprises User Plane Function (UPF) 434 and Application Server Function (ASF) 437. Wireless network slice 432 comprises UPF 435 and ASF 438. Wireless network slice 433 comprises UPF 436 and ASF 439. Public 5GNR RAN 411 may comprise a common carrier network, and private 5GNR RAN 412 may comprise an enterprise network like a government network or a campus network. ASFs 437-438 serve user applications like augmented-reality, hosted-computing, vehicle-control, and the like.

Initially, UEs 401-402 are located in network sector 407 and UE 403 is located in network sector 408. UEs 404-406 are not yet located in network sectors 407-408. For illustration, a simplified number of three UEs in one of sectors 407-408 using one of slices 431-432 is considered a UE threshold for the sector/slice combination. Wireless network slices 431-433 do not yet have any UE concentrations in sectors 407-408.

UE 401 wirelessly attaches to public 5GNR RAN 411 and registers with AMF 440. AMF 440 authenticates UE 401. AMF 440 interacts with NSSF 442 to select slices 431-433 for UE 401. AMF 440 signals SMF 441 to drive slices 431-433 for UE 401. SMF 441 signals core UPFs 434-436 in slices 431-433 to serve UE 401. AMF 440 signals RAN 411 to serve UE 401 and signals UE 401 to use RAN 441 and slices 431-433. UE 401 exchanges user data over RAN 411 and slices 431-433 (core UPFs 434-436 and ASFs 437-439).

UE 402 wirelessly attaches to public 5GNR RAN 411 and registers with AMF 440. AMF 440 authenticates UE 402. AMF 440 interacts with NSSF 442 to select slices 431-433 for UE 402. AMF 440 signals SMF 441 to drive slices 431-433 for UE 402. SMF 441 signals core UPFs 434-436 in slices 431-433 to serve UE 402. AMF 440 signals RAN 411 to serve UE 402 and signals UE 402 to use RAN 441 and slices 431-433. UE 402 exchanges user data over RAN 411 and slices 431-433 (core UPFs 434-436 and ASFs 437-439).

UE 403 wirelessly attaches to private 5GNR RAN 412 and registers with AMF 440. AMF 440 authenticates UE 403. AMF 440 interacts with NSSF 442 to select slices 431-433 for UE 403. AMF 440 signals SMF 441 to drive slices 431-433 for UE 403. SMF 441 signals core UPFs 434-436 in slices 431-433 to serve UE 403. AMF 440 signals RAN 412 to serve UE 403 and signals UE 403 to use RAN 412 and slices 431-433. UE 403 exchanges user data over RAN 412 and slices 431-433 (core UPFs 434-436 and ASFs 437-439). The operation proceeds to FIG. 5.

Figure 5:
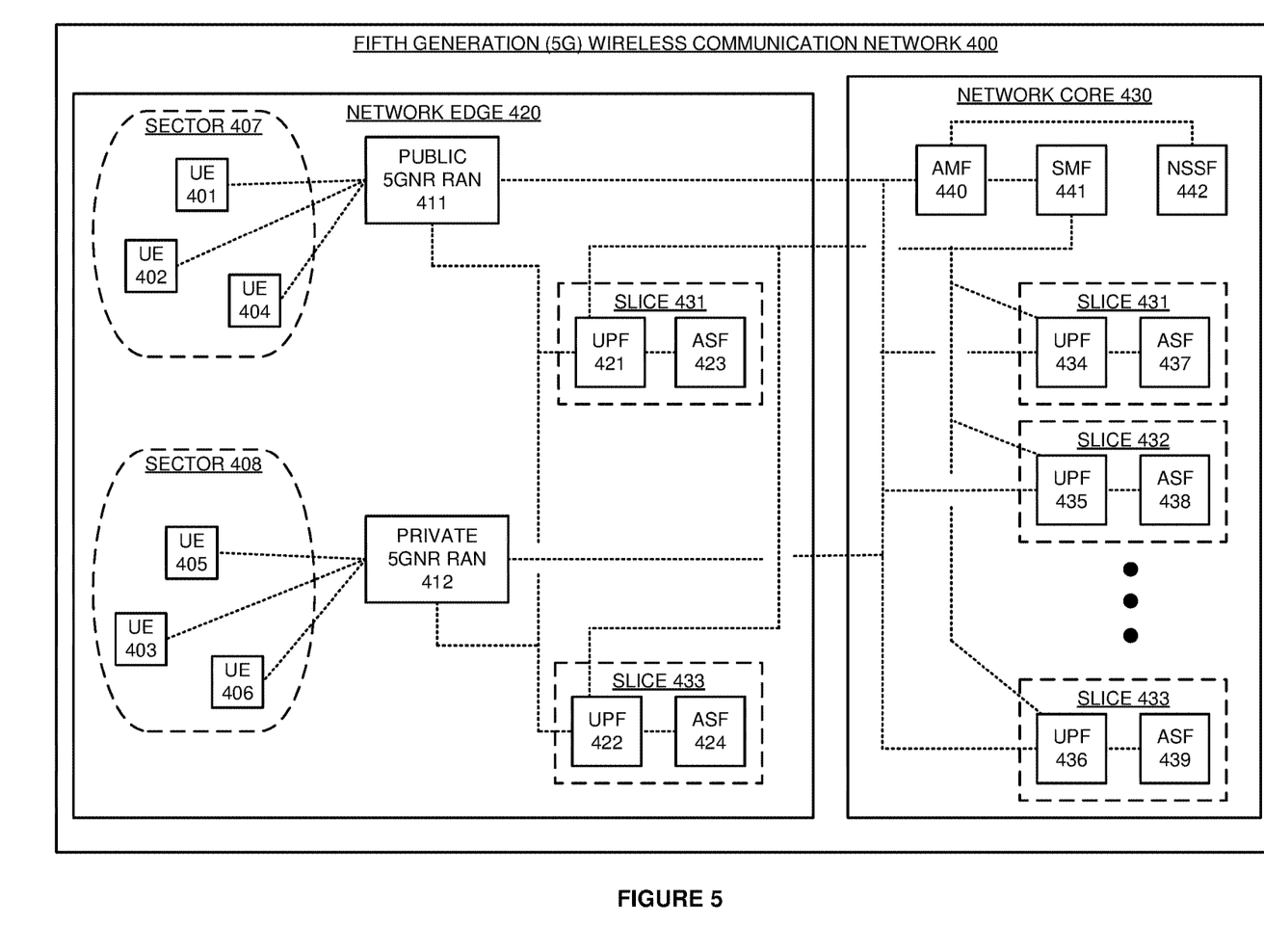
FIG. 5 illustrates the 5G wireless communication network to serve the UEs over the wireless network slices based on the geographic UE concentrations.

FIG. 5 illustrates 5G wireless communication network 400 to serve UEs 401-406 over wireless network slices 431-433 based on the geographic UE concentrations. 5G wireless communication network 400 comprises an example of wireless communication network 100, although network 100 may differ. Wireless network edge 420 will host slices 431 and 433. Wireless network slice 431 comprises UPF 421 and ASF 423. Wireless network slice 433 comprises UPF 421 and ASF 423. ASFs 423-424 serve user applications like augmented-reality, hosted-computing, vehicle-control, and the like. The following operation continues from the above discussion of FIG. 4.

UE 404 wirelessly attaches to public 5GNR RAN 411 and registers with AMF 440. AMF 440 authenticates UE 404. AMF 440 interacts with NSSF 442 to select slice 431 for UE 404. AMF 440 detects that slice 431 now has a UE concentration (3 UEs) in sector 407 and responsively signals SMF 441 to drive slice 431 at the edge for UE 404. SMF 441 signals edge UPF 421 in slice 431 to serve UE 404. AMF 440 signals RAN 411 to serve UE 404 and signals UE 404 to use RAN 411 and edge UPF 421 in slice 431. UE 404 exchanges user data over RAN 411 and slice 431 (edge UPF 421 and ASF 423). UEs 401-402 may be redirected to edge UPF 421 for slice 431 in a similar manner. UE 403 is not typically redirected since sector 408 does not have a UE concentration for slice 431.

UE 405 wirelessly attaches to private RAN 412 and registers with AMF 440. AMF 440 authenticates UE 405. AMF 440 interacts with NSSF 442 to select slices 431-433 for UE 405. AMF 440 signals SMF 441 to drive slices 431-433 for UE 405. SMF 441 signals core UPFs 434-436 in slices 431-433 to serve UE 405. AMF 440 signals RAN 412 to serve UE 405 and signals UE 405 to use RAN 411 and slices 431-433. UE 405 exchanges user data over RAN 412 and slices 431-433 (core UPFs 434-436 and ASFs 437-439).

UE 406 wirelessly attaches to private 5GNR RAN 412 and registers with AMF 440. AMF 440 authenticates UE 406. AMF 440 interacts with NSSF 442 to select slice 433 for UE 406. AMF 440 detects that slice 433 now has a UE concentration (3 UEs) in sector 408 and responsively signals SMF 441 to drive slice 433 at the edge for UE 406. SMF 441 signals edge UPF 422 in slice 433 to serve UE 406. AMF 440 signals RAN 412 to serve UE 406 and signals UE 406 to use RAN 412 and edge UPF 422 in slice 433. UE 406 exchanges user data over RAN 412 and slice 433 (edge UPF 422 and ASF 424). UEs 403 and 405 may be redirected to edge UPF 422 for slice 433 in a similar manner. UEs 401-402 are not typically redirected since sector 407 does not have a UE concentration for slice 433.

Figure 6:
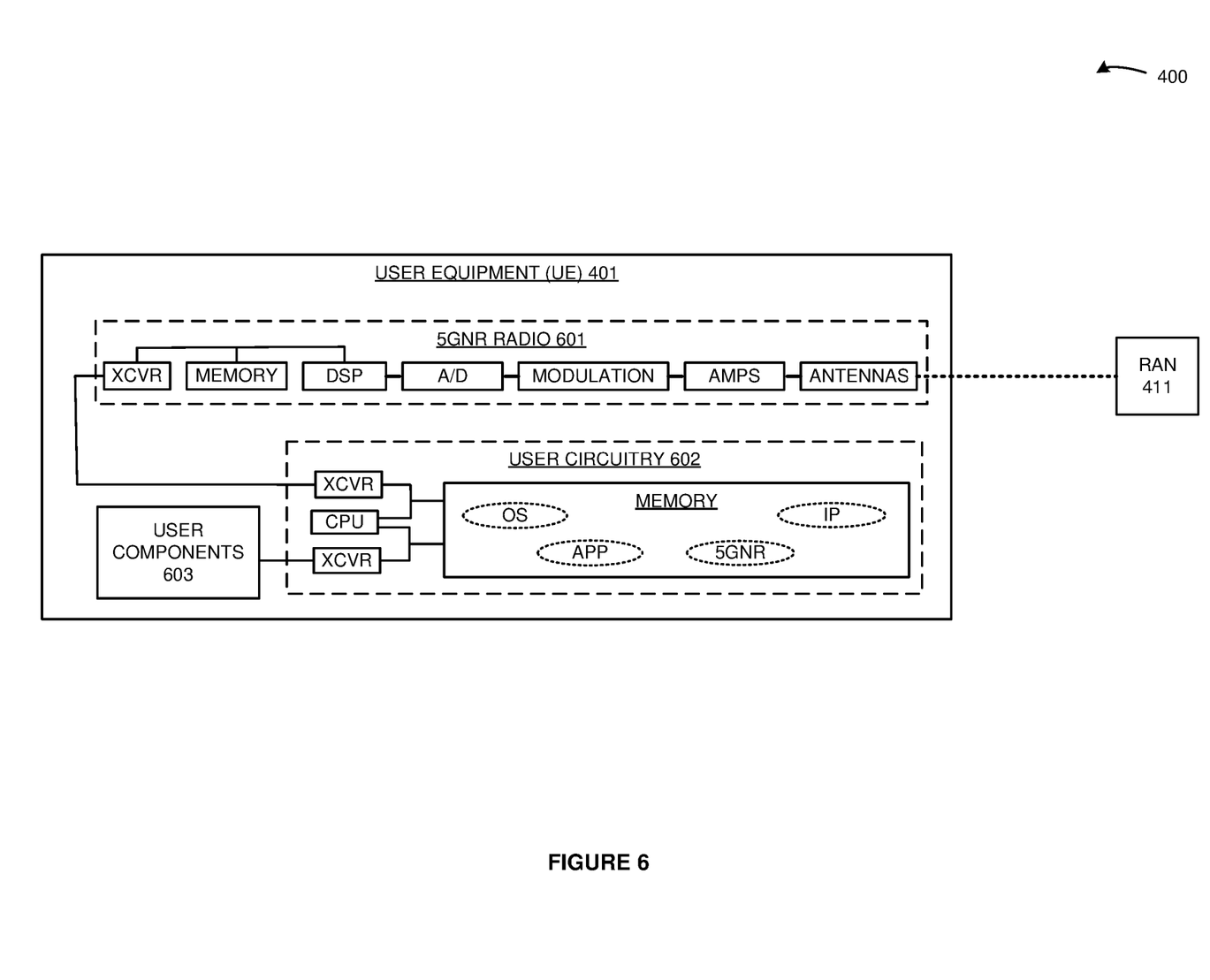
FIG. 6 illustrates a UE in the 5G wireless communication network.

FIG. 6 illustrates UE 401 in 5G wireless communication network 400. UE 401 comprises an example of UEs 101-103 and 402-406, although these UEs may differ. UE 401 comprises 5G New Radio (5GNR) radio 601, user circuitry 602, and user components 603. User components 603 comprise sensors, controllers, displays, or some other user apparatus that consumes wireless data service. 5GNR radio 601 comprises antennas, amplifiers, filters, modulation, analog-to-digital interfaces, DSP, memory, and transceivers that are coupled over bus circuitry. User circuitry 602 comprises memory, CPU, user interfaces and components, and transceivers that are coupled over bus circuitry. The memory in user circuitry 602 stores an operating system, user applications (APP), and network applications for 5GNR and IP. The 5GNR network applications comprise components like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radio 601 are wirelessly coupled to RAN 411 over a 5GNR link. Transceivers (XCVRs) in 5GNR radio 601 are coupled to transceivers in user circuitry 602. Transceivers in user circuitry 602 are coupled to user components 603. The CPU in user circuitry 602 executes the operating system, user applications, and network applications to exchange network signaling and user data with RAN 411.

Figure 7:
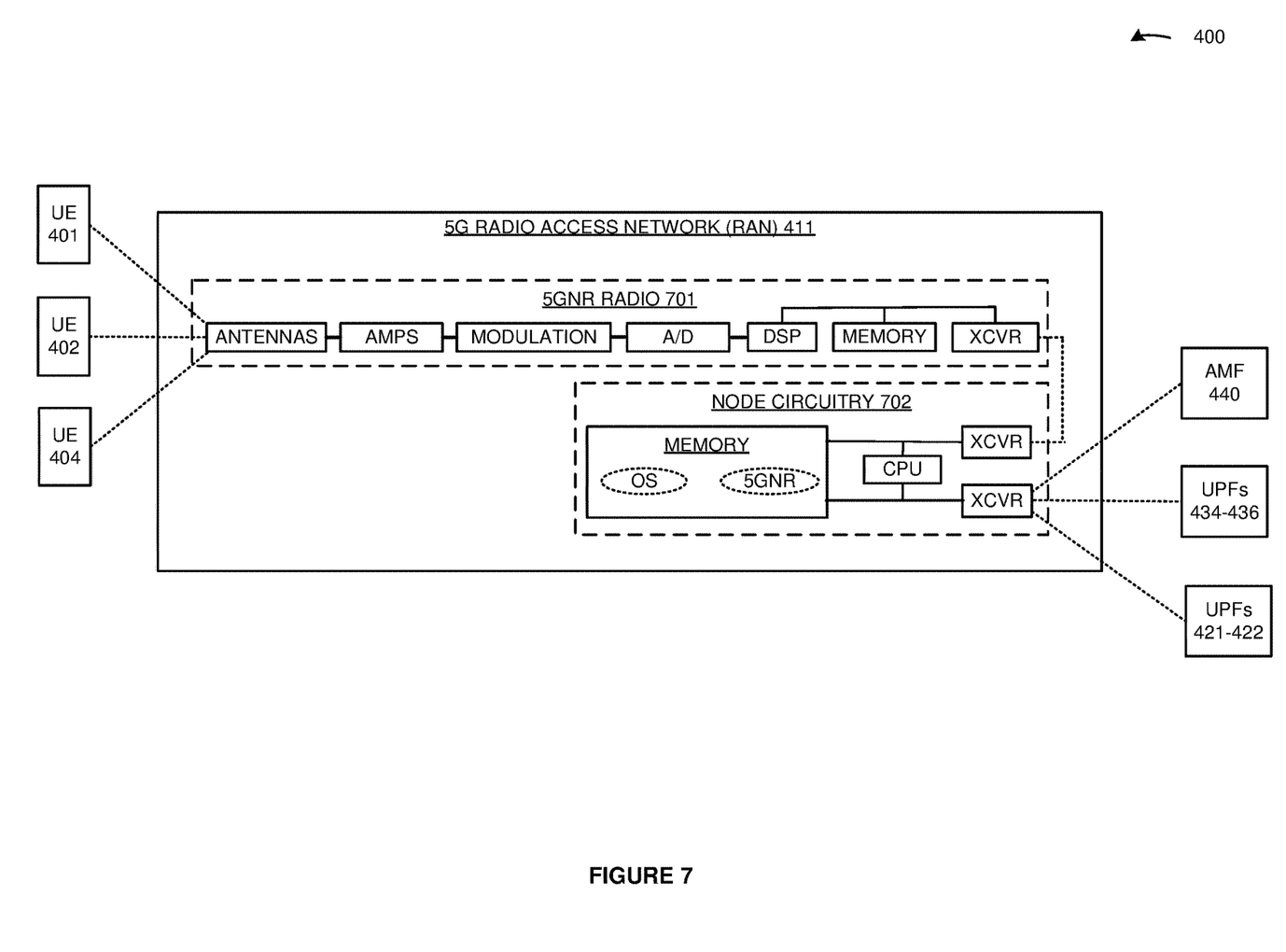
FIG. 7 illustrates a 5G Radio Access Network (RAN) in the 5G wireless communication network.

FIG. 7 illustrates 5G Radio Access Network (RAN) 411 in 5G wireless communication network 400. 5G RAN 411 comprises an example of RANs 111 and 412, although RANs 111 and 412 may differ. 5G RAN 411 comprises 5GNR radio 701 and node circuitry 702. 5GNR radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for IP and 5GNR. The 5GNR network applications comprise components like PHY, MAC, RLC, PDCP, SDAP, and RRC. The antennas in 5GNR radio 701 are wirelessly coupled to UEs 401-402 and 404 over 5GNR links. Transceivers in 5GNR radio 701 are coupled to transceivers in node circuitry 702. Transceivers in node circuitry 702 are coupled to AMF 440, UPFs 421-422, and UPFs 434-436. The CPU in node circuitry 702 executes the operating systems and network applications to exchange network signaling with AMF 440 and UEs 401-402 and 404. The CPU in node circuitry 702 executes the operating systems and network applications to exchange user data with UEs 401-402 and 404 and UPFs 421-422 and 434-436.

Figure 8:
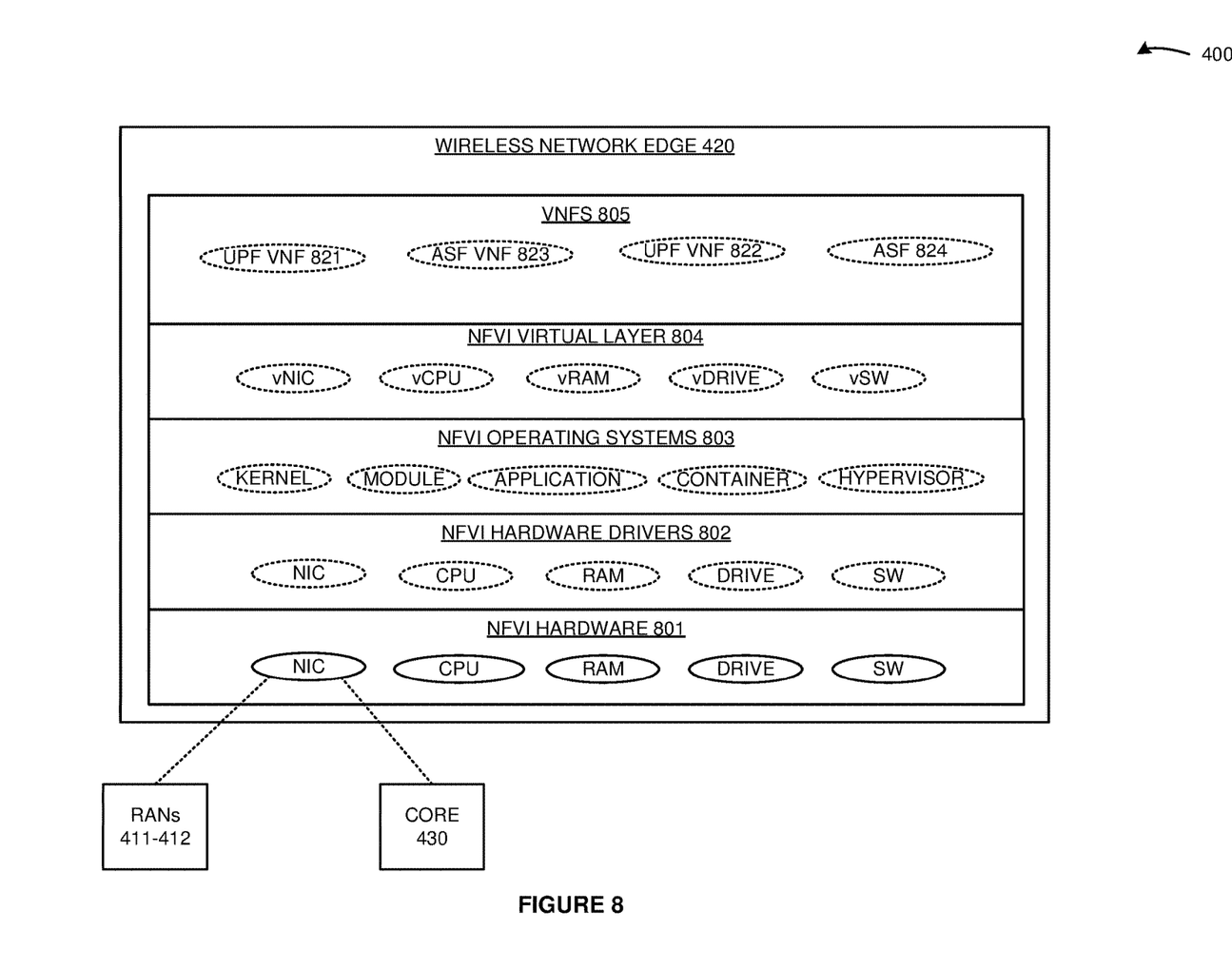
FIG. 8 illustrates a wireless network edge in the 5G wireless communication network.

FIG. 8 illustrates wireless network edge 420 in 5G wireless communication network 400. Wireless network edge 420 comprises an example of edge user-plane 112, although edge user-plane 112 may differ. Wireless network edge 420 comprises Network Function Virtualization Infrastructure (NFVI) hardware 801, NFVI hardware drivers 802, NFVI operating systems 803, NFVI virtual layer 804, and Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. VNFs 805 comprise UPF VNFs 821-822 and ASF VNFs 823-824. Wireless network edge 420 may be located at a single site or be distributed across multiple geographic locations. The NIC transceivers in NFVI hardware 801 are coupled to 5G RANs 411-412 and wireless network core 430. NFVI hardware 801 executes NFVI hardware drivers 802, NFVI operating systems 803, NFVI virtual layer 804, and VNFs 805 to form and operate UPFs 421-422 and ASFs 423-424.

Figure 9:
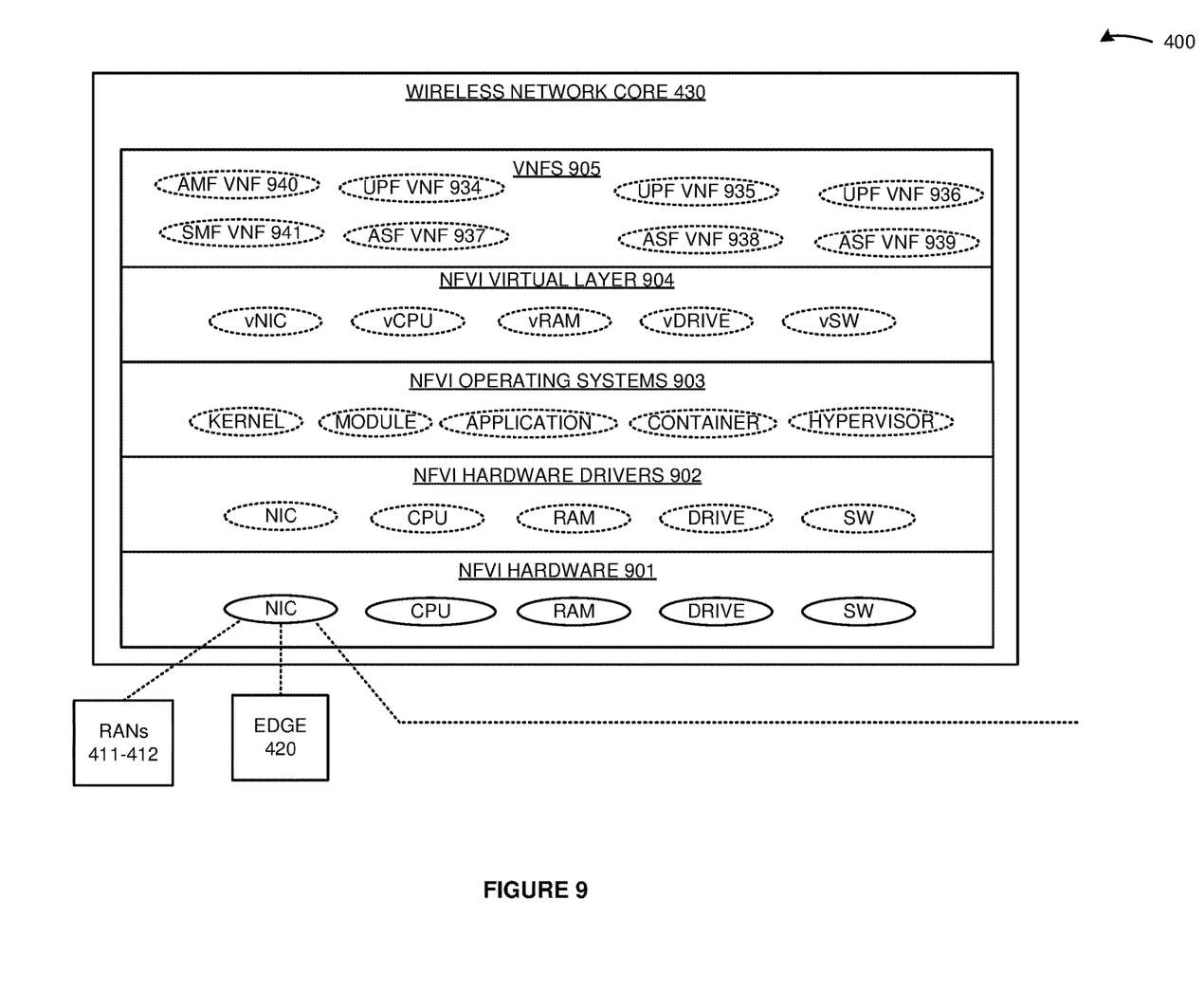
FIG. 9 illustrates a wireless network core in the 5G wireless communication network.

FIG. 9 illustrates a wireless network core 430 in 5G wireless communication network 400. Wireless network core 430 comprises an example of core user-plane 113 and core control-plane 114, although planes 113-114 may differ. Wireless network core 430 comprises NFVI hardware 901, NFVI hardware drivers 902, NFVI operating systems 903, NFVI virtual layer 904, and VNFs 905. NFVI hardware 901 comprises NICs, CPU, RAM, DRIVE, and SW. NFVI hardware drivers 902 comprise software that is resident in the NIC, CPU, RAM, DRIVE, and SW. NFVI operating systems 903 comprise kernels, modules, applications, containers, hypervisors, and the like. NFVI virtual layer 904 comprises vNIC, vCPU, vRAM, vDRIVE, and vSW. VNFs 905 comprise UPF VNFs 934-936, ASF VNFs 937-939, AMF VNF 940, and SMF VNF 941. Other VNFs like Policy Control Function (PCF), Network Repository Function (NRF), and Unified Data Management (UDM) are typically present but omitted for clarity. Wireless network core 430 may be located at a single site or be distributed across multiple geographic locations. The NIC transceivers in NFVI hardware 901 are coupled to 5G RANs 411-412, wireless network edge 420, and external data systems. NFVI hardware 901 executes NFVI hardware drivers 902, NFVI operating systems 903, NFVI virtual layer 904, and VNFs 905 to form and operate UPFs 434-436, ASFs 437-439, AMF 440, and SMF 441.

Figure 10:
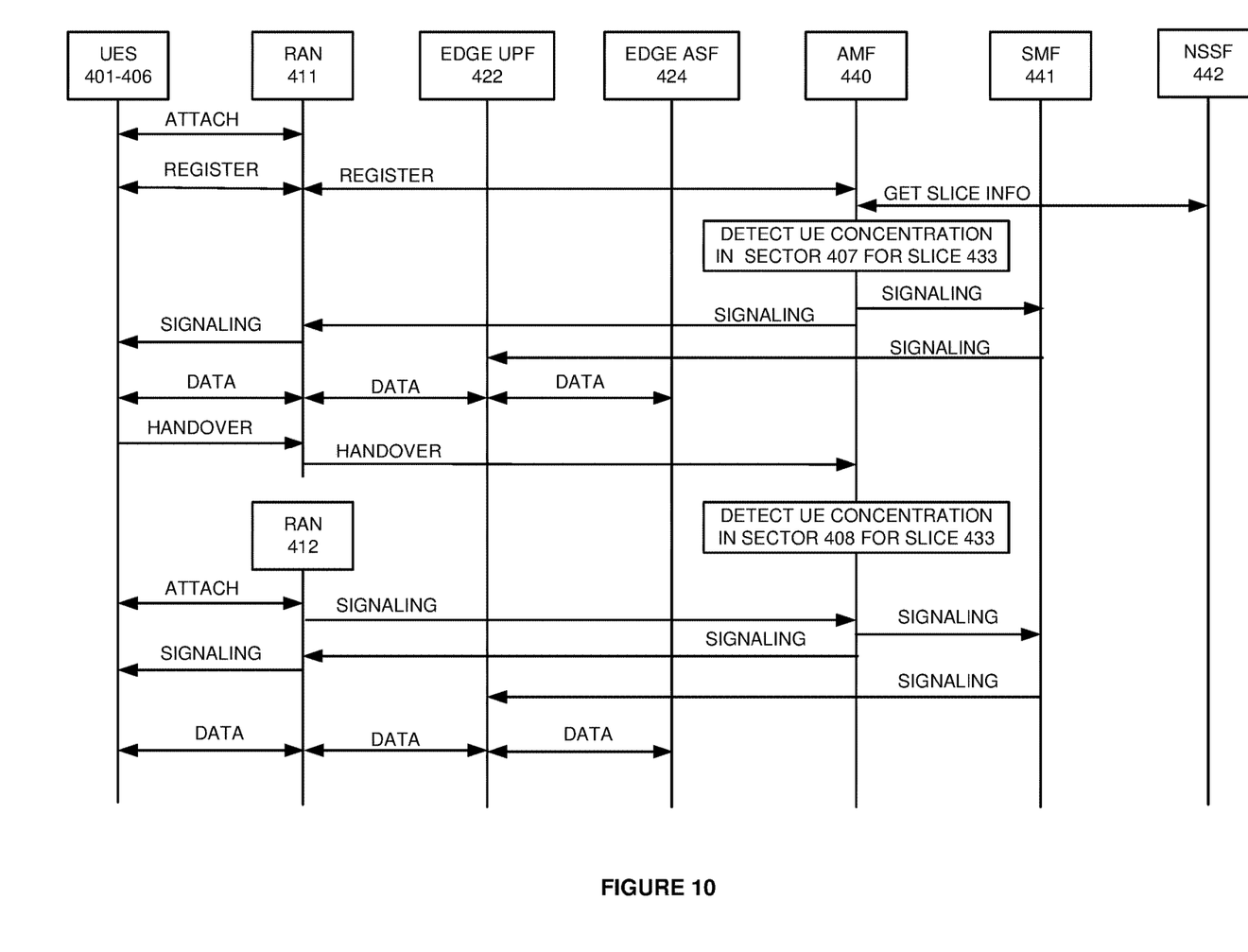
FIG. 10 illustrates an exemplary operation of the 5G wireless communication network to serve the UEs over the wireless network slices based on the geographic UE concentrations.

FIG. 10 illustrates an exemplary operation of 5G wireless communication network 400 to serve UEs 401-406 over wireless network slices 431-433 based on the geographic UE concentrations. The operation may vary in other examples. In this example, all UEs 401-406 initially attach to RAN 411 in sector 407. UEs 401-406 register with AMF 440 over RAN 411. AMF 440 authenticates UEs 401-406. AMF 440 interacts with NSSF 442 to get slice information for UEs 401-406. In this example, AMF 440 selects slice 433 for UEs 401-406. AMF 440 detects a UE concentration in sector 407 for wireless network slice 433 and responsively signals SMF 441 to drive slice 433 for UEs 401-406 in network edge 420—and not in network core 430. AMF 440 signals RAN 411 to serve UEs 401-406 and signals UEs 401-406 to use RAN 411 and slice 433. SMF 441 launches edge UPF 422 and edge ASF 424 in network edge 420. SMF 441 signals edge UPF 422 and edge ASF 424 to serve UEs 401-406 over RAN 411. UEs 401-406 exchange user data with edge ASF 424 over RAN 411 and UPF 422.

Due to UE mobility—perhaps as a UE fleet— UEs 401-406 signal RAN 411 that UEs 401-406 are handing over from RAN 411 in sector 407 to RAN 412 in sector 408. RAN 411 signals AMF 440 of the handover to RAN 412 in sector 408. AMF 440 detects a UE concentration in sector 408 for wireless network slice 433 and responsively signals SMF 441 to drive slice 433 for UEs 401-406 in network edge 420—and not in network core 430. AMF 440 signals RAN 412 to serve UEs 401-406 and signals UEs 401-406 to use RAN 412 and slice 433. SMF 441 signals edge UPF 422 and edge ASF 424 to serve UEs 401-406 over RAN 412. UEs 401-406 exchange user data with edge ASF 424 over RAN 412 and UPF 422.

Figure 11:
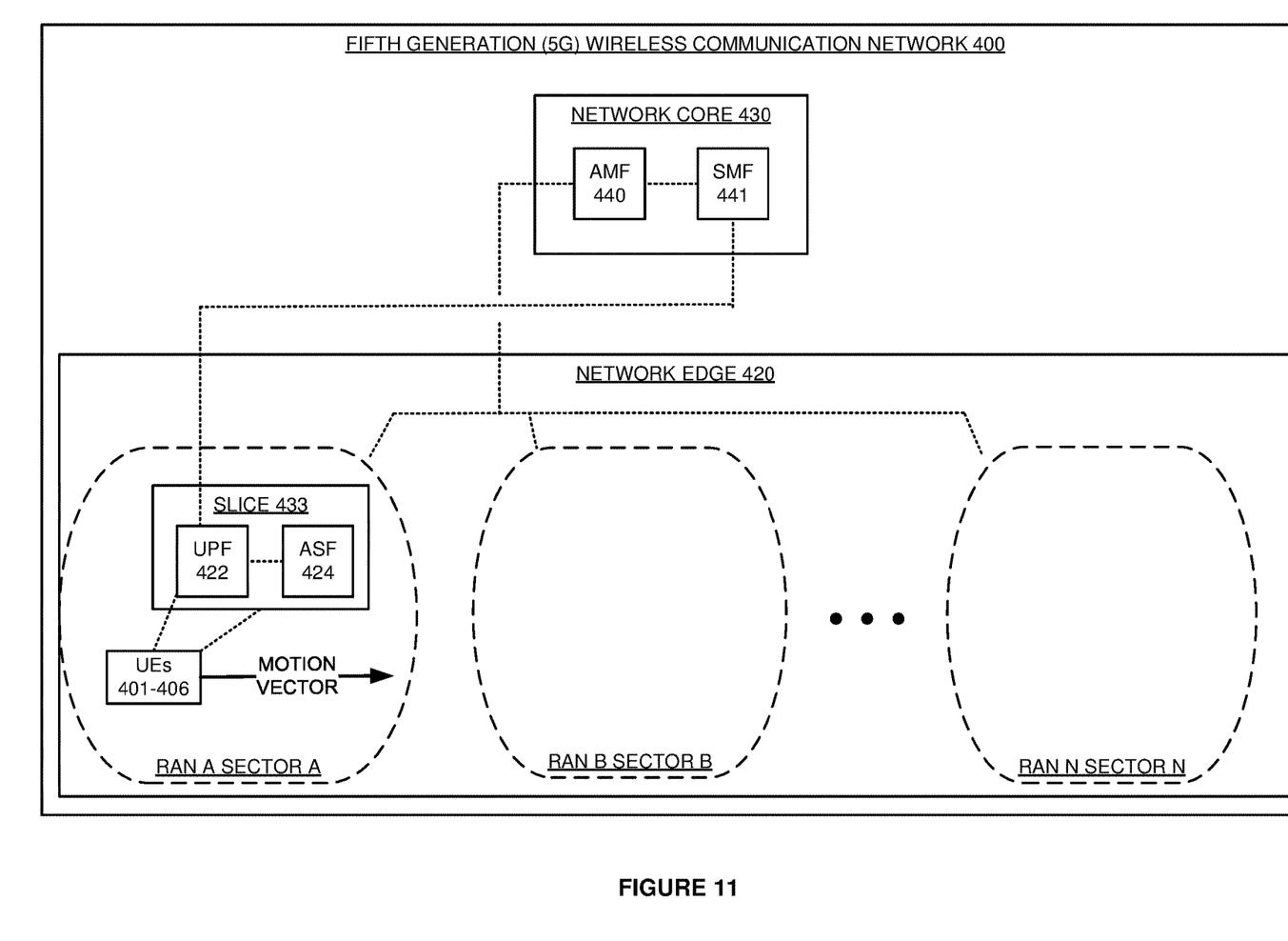
FIG. 11 illustrates an exemplary operation of the 5G wireless communication network to serve the UEs over the wireless network slices based on mobile UE concentrations.

FIG. 11 illustrates an exemplary operation of 5G wireless communication network 400 to serve UEs 401-406 over wireless network slice 433 based on a mobile UE concentration. The operation may vary in other examples. Initially, UEs 401-406 are located in sector A of RAN A. AMF 441 detects the UE concentration for slice 433 in sector A and signals SMF 441 to use an edge user-plane for UEs 401-406 and slice 433. SMF 441 controls edge UPF 422 to serve UEs 401-406 with connectivity to edge ASF 424. UE 401-406 use edge UPF 422 and edge ASF 424 in slice 433.

UEs 401-406 are moving together toward sector B in RAN B. For example, a group of first-responders with augmented-reality headsets (UEs 401-406) may use ASF 424 in slice 433 to drive live their headsets, and the group of first-responders may share a common vehicle or vehicle fleet that is moving toward RAN B sector B. AMF 441 determines a motion vector for UEs 401-406. Based on the motion vector, AMF 441 detects the future UE concentration for slice 433 in RAN B sector B and signals SMF 441 to launch and then use an edge user-plane for UEs 401-406 and slice 433 in RAN B sector B. SMF 441 signals wireless network edge 420 to execute UPF 425 and ASF 427 for slice 433. The operation now proceeds to FIG. 12.

Figure 12:
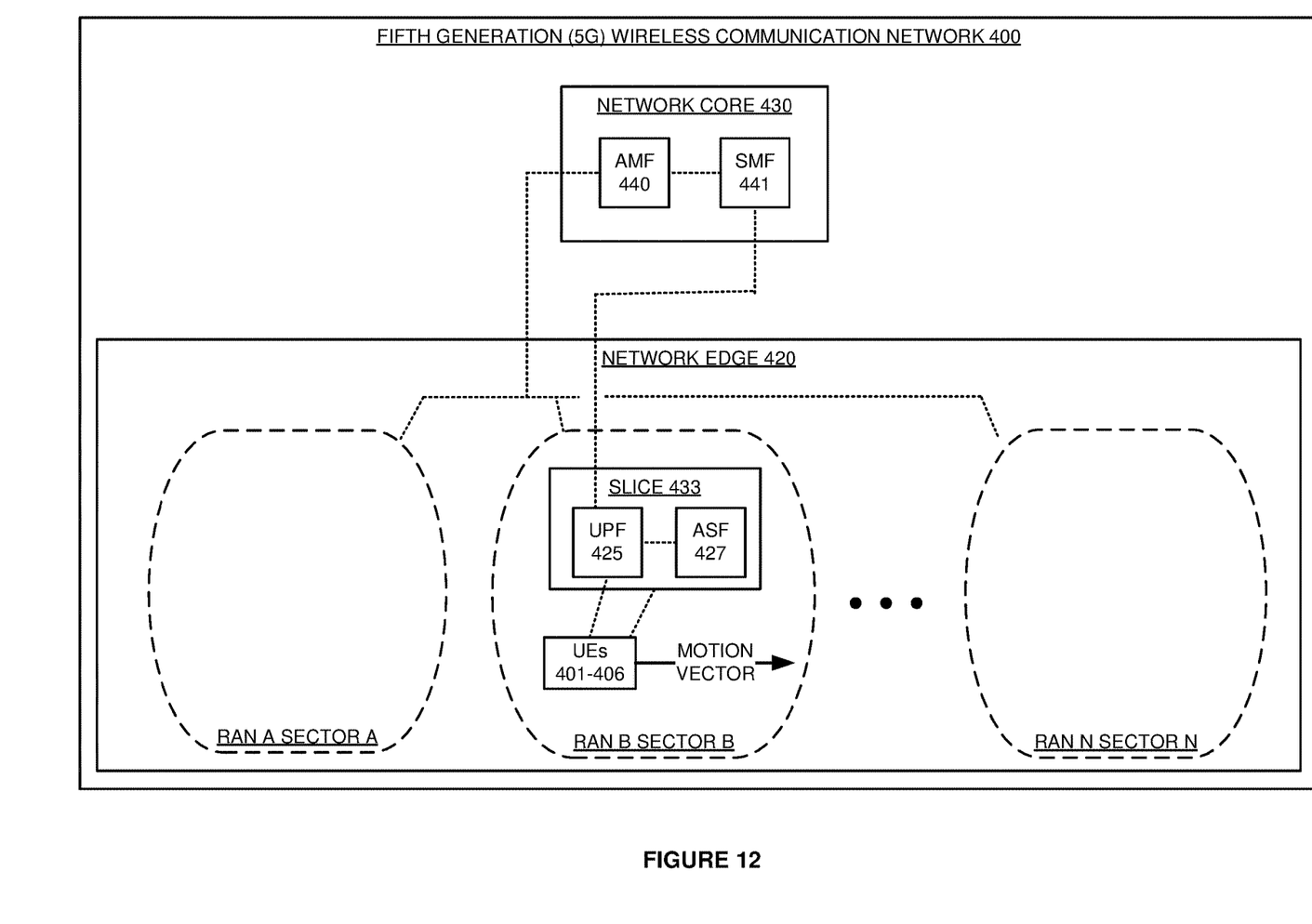
FIG. 12 illustrates an exemplary operation of the 5G wireless communication network to serve the UEs over the wireless network slices based on the mobile UE concentrations.

FIG. 12 illustrates an exemplary operation of 5G wireless communication network 400 to serve UEs 401-406 over wireless network slice 433 based on the mobile UE concentration. The operation may vary in other examples. SMF 441 controls edge UPF 425 in RAN B sector B to serve UEs 401-406 with connectivity to edge ASF 427. UEs 401-406 use edge UPF 425 and edge ASF 427 in slice 433. UEs 401-406 are moving together toward RAN N sector N. AMF 441 determines a new motion vector for UEs 401-406. Based on the new motion vector, AMF 441 detects the future UE concentration for slice 433 in RAN N sector N and signals SMF 441 to launch and then use an edge user-plane for UEs 401-406 and slice 433 in RAN N sector N. SMF 441 signals wireless network edge 420 to execute UPF 426 and ASF 428 for slice 433. The operation now proceeds to FIG. 13.

Figure 13:
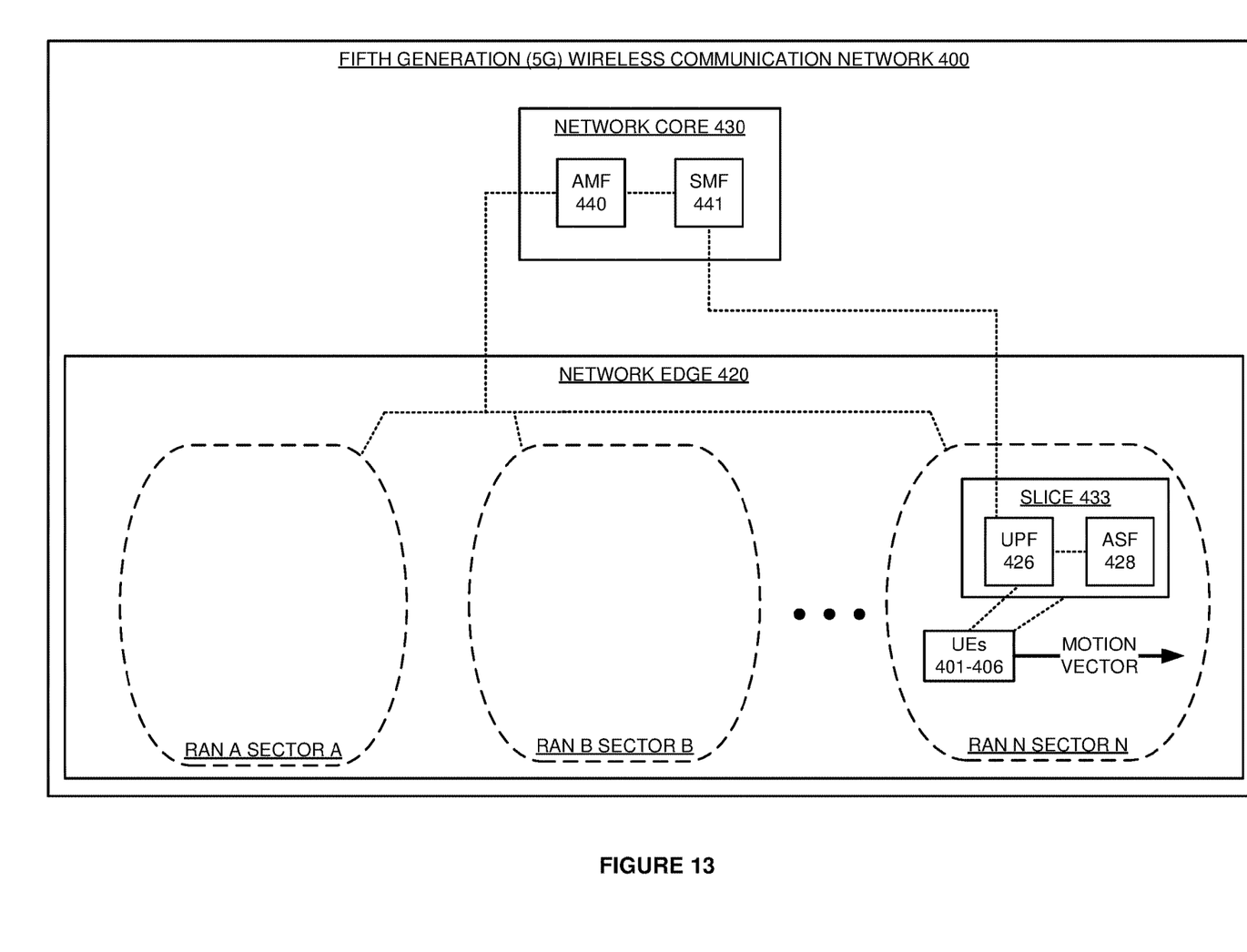
FIG. 13 illustrates an exemplary operation of the 5G wireless communication network to serve the UEs over the wireless network slices based on the mobile UE concentrations.

FIG. 13 illustrates an exemplary operation of 5G wireless communication network 400 to serve UEs 401-406 over wireless network slice 433 based on the mobile UE concentration. The operation may vary in other examples. SMF 441 controls edge UPF 426 in RAN N sector N to serve UEs 401-406 with connectivity to edge ASF 428. UEs 401-406 use edge UPF 426 and edge ASF 428 in slice 433. UEs 401-406 are still moving together and AMF 441 determines a new motion vector for UEs 401-406. Based on the new motion vector, AMF 441 may detect another future UE concentration for slice 433 in another sector and signal SMF 441 to launch and then use an edge user-plane for UEs 401-406 and slice 433 in the other sector.

The wireless data network circuitry described above comprises computer hardware and software that form special-purpose networking circuitry to serve UEs over wireless network slices based on UE concentrations. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs over wireless network slices based on UE concentrations.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UEs) over a wireless network slice, the method comprising:
   a core user-plane in the wireless network slice exchanging user data with the UEs over a Radio Access Network (RAN);
   a core control-plane determining when the wireless network slice has a concentration of the UEs that exceeds a threshold in a geographic area;
   when the wireless network slice has the concentration of the UEs that exceeds the threshold in the geographic area, the core control-plane signaling an edge user-plane in the wireless network slice to serve the UEs that use the wireless network slice in the geographic area; and
   the edge user-plane in the wireless network slice exchanging additional user data over the RAN with the UEs that use the wireless network slice in the geographic area.

2. The method of claim 1 further comprising:
   the core control-plane determining when the concentration of the UEs is moving to another geographic area;
   when the concentration of the UEs is moving to the other geographic area, the core control-plane signaling another edge user-plane in the wireless network slice to serve the UEs that use the wireless network slice in the other geographic area; and
   the edge user-plane in the wireless network slice exchanging more user data over another RAN with the UEs in the other geographic area that use the wireless network slice.

3. The method of claim 2 wherein the core control-plane signaling the other edge user-plane in the wireless network slice to serve the UEs that use the wireless network slice in the other geographic area comprises first determining that the other edge user-plane delivers a quality-of-service that is suitable for the wireless network slice.

4. The method of claim 2 wherein the core control-plane signaling the edge user-plane in the wireless network slice to serve the UEs that use the wireless network slice in the geographic area comprises launching the edge user-plane in an edge computer in the geographic area.

5. The method of claim 2 wherein the core control-plane signaling the other edge user-plane in the wireless network slice to serve the UEs that use the wireless network slice in the other geographic area comprises launching the other edge user-plane in an edge computer in the other geographic area.

6. The method of claim 2 wherein RAN comprises public RAN and the other RAN comprises a private RAN.

7. The method of claim 2 wherein RAN comprises Fifth Generation New Radio (5GNR) RAN and the other RAN comprises a non-5GNR RAN.

8. The method of claim 1 wherein the geographic area comprises a wireless network sector.

9. The method of claim 1 wherein core control-plane comprises an Access and Mobility Management Function (AMF), Session Management Function (SMF), and Network Slice Selection Function (NSSF).

10. The method of claim 1 wherein:
    the core user-plane comprises at least one of a core User-Plane Function (UPF) and core Application Server Function (ASF); and
    the edge user-plane comprises at least one of an edge UPF and edge ASF.

11. A wireless communication network to serve User Equipment (UEs) over a wireless network slice, the wireless communication network comprising:
    a core user-plane in the wireless network slice configured to exchange user data with the UEs over a Radio Access Network (RAN);
    a core control-plane configured to determine when the wireless network slice has a concentration of the UEs that exceeds a threshold in a geographic area;
    when the wireless network slice has the concentration of the UEs that exceeds the threshold in the geographic area, the core control-plane configured to signal an edge user-plane in the wireless network slice to serve the UEs that use the wireless network slice in the geographic area; and
    the edge user-plane in the wireless network slice configured to exchange additional user data over the RAN with the UEs that use the wireless network slice in the geographic area.

12. The wireless communication network of claim 11 further comprising:
    the core control-plane configured to determine when the concentration of the UEs is moving to another geographic area;
    when the concentration of the UEs is moving to the other geographic area, the core control-plane configured to signal another edge user-plane in the wireless network slice to serve the UEs that use the wireless network slice in the other geographic area; and the edge user-plane in the wireless network slice configured to exchange more user data over another RAN with the UEs in the other geographic area that use the wireless network slice.

13. The wireless communication network of claim 12 wherein the core control-plane is configured to first determine that the other edge user-plane delivers a quality-of-service that is suitable for the wireless network slice before signaling the other edge user-plane to serve the UEs that use the wireless network slice in the other geographic area.

14. The wireless communication network of claim 12 wherein the core control-plane is configured to launch the edge user-plane in an edge computer in the geographic area before signaling the edge user-plane in the wireless network slice to serve the UEs that use the wireless network slice in the geographic area.

15. The wireless communication network of claim 12 wherein the core control-plane is configured to launch the other edge user-plane in an edge computer in the other geographic area before signaling the other edge user-plane in the wireless network slice to serve the UEs that use the wireless network slice in the other geographic area.

16. The wireless communication network of claim 12 wherein RAN comprises public RAN and the other RAN comprises a private RAN.

17. The wireless communication network of claim 12 wherein RAN comprises Fifth Generation New Radio (5GNR) RAN and the other RAN comprises a non-5GNR RAN.

18. The wireless communication network of claim 11 wherein the geographic area comprises a wireless network sector.

19. The wireless communication network of claim 11 wherein core control-plane comprises an Access and Mobility Management Function (AMF), Session Management Function (SMF), and Network Slice Selection Function (NSSF).

20. The wireless communication network of claim 11 wherein:

the core user-plane comprises at least one of a core User Plane Function (UPF) and a core Application Server Function (ASF); and the edge user-plane comprises at least one of an edge UPF and edge ASF.

* * * * *